United States Patent  (10) Patent No.: US 9,344,229 B2
Huang                                (45) Date of Patent:     May 17, 2016

(54) METHOD AND DEVICE FOR ALLOCATING CARRIERS IN CARRIER AGGREGATION SYSTEM

(75) Inventor: Yada Huang, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 200 days.

(21) Appl. No.: 13/377,182

(22) PCT Filed: May 21, 2010

(86) PCT No.: PCT/CN2010/073091
§ 371 (c)(1),
(2), (4) Date: Dec. 9, 2011

(87) PCT Pub. No.: WO2010/142198
PCT Pub. Date: Dec. 16, 2010

(65) Prior Publication Data
US 2012/0082125 A1    Apr. 5, 2012

(30) Foreign Application Priority Data

Jun. 11, 2009  (CN) .......................... 2009 1 0086953

(51) Int. Cl.
*H04W 72/04*    (2009.01)
*H04L 5/00*     (2006.01)

(52) U.S. Cl.
CPC ............. *H04L 5/0007* (2013.01); *H04L 5/001* (2013.01); *H04L 5/0037* (2013.01); *H04L 5/0094* (2013.01)

(58) Field of Classification Search
CPC .......... H04W 72/0413; H04W 72/042; H04W 72/0453; H04W 74/004; H04W 72/04; H04W 72/12; H04W 72/1284; H04W 74/0866
USPC .......................................... 370/329; 455/450
See application file for complete search history.

(56) References Cited

U.S. PATENT DOCUMENTS 8,289,864 B2 * 10/2012  Dolganow et al. ............ 370/252
8,423,037 B2 *  4/2013  Pajukoski ............ H04B 7/0434
                                                    455/101

(Continued)

FOREIGN PATENT DOCUMENTS

CN      101404539 A      4/2009
CN      101405983 A      4/2009

OTHER PUBLICATIONS

International Search Report for PCT/CN2010/073091, English translation attached to original, Both Completed by the Chinese Patent Office on Aug. 13, 2010, All together 8 Pages.

*Primary Examiner* — Edan Orgad
*Assistant Examiner* — Emmanuel Maglo
(74) *Attorney, Agent, or Firm* — Brooks Kushman P.C.

(57) ABSTRACT

A method for allocating a carrier in a carrier aggregation system is disclosed. The method includes a network side allocating a component carrier and identifier information of a user equipment to the user equipment, and notifying the user equipment of the allocated component carrier and the identifier information of the user equipment, and/or a corresponding relationship between the allocated downlink component carrier and the identifier information of the user equipment. A device for allocating a carrier in carrier aggregation system is disclosed. The device includes an allocation unit configured to allocate a component carrier and identifier information of a user equipment to the user equipment, and a notification unit configured to notify the user equipment of the allocated component carrier and the identifier information of the user equipment, and/or the corresponding relationship between the allocated downlink component carrier and the identifier information of the user equipment.

18 Claims, 2 Drawing Sheets

Downlink carrier     DL5

Uplink carrier    UL4

(56) References Cited

U.S. PATENT DOCUMENTS

| | | | |
|---|---|---|---|
| 8,467,341 B2* | 6/2013 | Kim et al. | 370/329 |
| 8,526,309 B2* | 9/2013 | Yamada et al. | 370/235 |
| 8,594,010 B2* | 11/2013 | Chen | H04B 7/155 370/315 |
| 8,614,978 B2* | 12/2013 | Che | H04L 1/1635 370/328 |
| 8,620,335 B2* | 12/2013 | Lindstrom | H04L 5/001 370/252 |
| 8,873,685 B2* | 10/2014 | Dua | H04B 7/0877 375/267 |
| 9,042,299 B2* | 5/2015 | Kishiyama | H04J 13/004 370/328 |
| 9,136,998 B2* | 9/2015 | Che | H04L 5/001 |
| 9,137,003 B2* | 9/2015 | Pan | H04L 5/001 |
| 2007/0053294 A1 | 3/2007 | Ho et al. | |
| 2010/0254329 A1* | 10/2010 | Pan et al. | 370/329 |
| 2010/0290405 A1 | 11/2010 | Arnott et al. | |
| 2010/0296473 A1* | 11/2010 | Kim et al. | 370/329 |
| 2010/0303011 A1* | 12/2010 | Pan et al. | 370/328 |
| 2010/0304689 A1* | 12/2010 | McBeath et al. | 455/68 |
| 2011/0034175 A1* | 2/2011 | Fong et al. | 455/450 |
| 2011/0110441 A1* | 5/2011 | Chen et al. | 375/260 |
| 2011/0274031 A1* | 11/2011 | Gaal et al. | 370/315 |
| 2011/0292911 A1* | 12/2011 | Uemura et al. | 370/331 |
| 2014/0119261 A1* | 5/2014 | Wang et al. | 370/312 |

\* cited by examiner

METHOD AND DEVICE FOR ALLOCATING CARRIERS IN CARRIER AGGREGATION SYSTEM

CROSS-REFERENCE TO RELATED APPLICATION

This application is the U.S. national phase of PCT Appln. No. PCT/CN2010/073091 filed May 21, 2010 which claims priority to Chinese Application No. 200910086953.3 filed Jun. 11, 2009, the disclosures of which are incorporated in their entirety by reference herein.

TECHNICAL FIELD

The present invention relates to the carrier allocation technique in a carrier aggregation system, and more particularly, to a method and device for allocating carriers in a carrier aggregation system.

BACKGROUND OF THE RELATED ART

In the Evolved Universal Terrestrial Radio Access (E-UTRA) system of the 3rd Generation Partnership Project (3GPP), the shared channel technique is used to improve throughput of a cell and the number of users of the cell.

Downlink data of a cell in the Long Term Evolution (LTE) system is transmitted through the Physical Downlink Shared Channel (PDSCH), and uplink data is transmitted through the Physical Uplink Shared Channel (PUSCH). Scheduling information on the shared channels is sent by the Physical Downlink Control Channel (PUCCH). The Physical Uplink Control Channel (PUCCH) sends uplink control information such as response (ACK/NACK), Channel Quality Indicator (CQI), etc. Downlink Control Information (DCI) transmitted by the PDCCH includes a plurality of formats, wherein some are used for uplink resource scheduling, some are used for downlink resource scheduling, and the others are used for downlink control information of other physical layers, such as power control information, etc. The PDCCH will carry a Radio Network Temporary Identifier (RNTI) in a mask way, including an identifier Cell RNTI (C-RNTI) for denoting control information of a specified User Equipment (UE), an identifier System Information RNTI (SI-RNTI) for denoting control information of cell system information, and an identifier Paging RNTI (P-RNTI) for denoting control information of paging message. Some RNTIs, such as the SI-RNTI and P-RNTI, are used commonly by the UE. When the UE is required to receive a system broadcast message or paging message, particular scheduling information can be obtained by reading PDCCH signaling containing the SI-RNTI or P-RNTI, thereby obtaining the system broadcast message and paging message through the scheduling information. The other RNTIs, such as C-RNTI and Semi-static Persistent Scheduling Radio Network Temporary Identifier (SPS-RNTI), are used specially by the specified UE. A network side will allocate one C-RNTI to a UE after the UE establishes a connection with a network. Afterwards, dynamic resource scheduling information of the UE will be identified by this C-RNTI. The C-RNTI at this time can be used as an identifier of the UE in the cell. The SPS-RNTI is suitable for indicating control information of semi-static persistent scheduling resources of the specified UE. Other Transmit Power Control RNTI (TPC-RNTI), such as Transmit Power Control-Physical Uplink Control Channel-RNTI (TPC-PUCCH-RNTI) and Transmit Power Control-Physical Uplink Shared Channel-RNTI (TPC-PUSCH-RNTI) etc., are identifiers used for indicating power control information of a set of UEs.

The Long Term Evolution-Advanced (LTE-Advanced or LTE-A) system is an evolved version of the LTE. The system will aggregate a plurality of carriers, bandwidths of which satisfy certain requirements, using a way of carrier aggregation so as to support a higher bandwidth and further obtain a higher data rate. FIG. 1 is a schematic diagram of a relationship between carrier aggregation and component carriers in the LTE-A system. As shown in FIG. 1, each aggregated carrier is called as one component carrier, which may be continuous in frequency band or may be discontinuous. Each component carrier is composed of a plurality of sub-carriers, and the number of the sub-carriers contained in each component carrier is determined based on the bandwidth size of the component carrier and frequency interval between the sub-carriers. In addition to satisfying or exceeding all related requirements of "Requirements for Evolved-UTRA (E-UTRA) and Evolved-UTRAN (E-UTRAN)" of 3GPP TR 25.913, the LTE-A system is required to achieve or exceed the requirements of IMT-Advanced proposed by the International Telecommunications Union-Radio communications Sector (ITU-R). The requirement for the LTE Release-8 backward compatibility means that a user equipment of the LTE Release-8 network can work in a LTE-Advanced network; an a user equipment of the LTE-Advanced network can work in a LTE Release-8 network. In addition, the LTE-Advanced network should be able to support aggregation of spectrum with different sizes, and work on spectrum resources (for example continuous spectrum resources of 100 MHz) higher than that of the LTE Release-8 network so as to achieve higher performance and target peak rate. Since the LTE-Advanced network is required to be able to access LTE users, its working frequency band is required to cover the frequency band of the current LTE, on which the available continuous spectrum bandwidth of 100 MHz has not existed. Therefore, a direct problem required to be solved by the LTE-Advanced network is to aggregate a plurality of component carriers having one of six LTE working bandwidths distributed in different bands to form wide bandwidth resources which can be used by the LTE-Advanced network. Considering the compatibility with the LTE Release-8 network, each component carrier of the LTE-Advanced network is required to satisfy the requirement that LTE users can be accessed. These carriers are called as backward compatible carriers, and like the common LTE for a UE of the LTE. Thus one cell of the LTE-A may be composed of a plurality of backward compatible carriers. For a terminal of the LTE, each backward compatible carrier may be considered as one LTE cell, and for the terminal of the LTE-A, the carrier aggregation can be carried out using a plurality of carriers. Non backward compatible carriers, which are unable to be used by the terminal of the LTE but can be used as carrier aggregation by the terminal of the LTE-A, are different from backward compatible carriers. In a LTE-A cell, since the LTE-A extends the working bandwidth of the UE from the maximal of 20 MHz of the LTE to the maximal of 100 MHz of the LTE-A, the 100 MHz of the LTE-A may be continuous in frequency band or may be discontinuous, and even may support discontinuous carrier aggregation across frequency bands, that is to say, the discontinuous carriers are located in different frequency bands respectively, for example, one carrier is at 1.8 GHz, and another carrier is at 2.6 GHz, resulting in the UE of the LTE-A being required to aggregate two component carriers with a very large frequency span, which puts forward a very high requirement for radio frequency and base band processing capabilities of the UE.

The LTE-A technique is required to, on the one hand, keep the compatibility with the LTE, on the other hand, decrease the complexity of the LTE-A terminal, because the UE of the LTE-A is required to not only work in the LTE cell, but also support carrier aggregation. Unlike the LTE-A system, there is the only one carrier in the LTE cell, thus when the UE of the LTE works in the LTE cell or the backward compatible carriers of the LTE-A, there is no carrier selection problem. However, when the UE of the LTE-A works in the LTE-A cell, and when the LTE-A cell is composed of a plurality of component carriers, how the UE of the LTE-A uses physical resources under a plurality of carriers becomes a problem to be solved urgently.

SUMMARY OF THE INVENTION

In view of this, a main object of the present invention is to provide a method and device for allocating a carrier in a carrier aggregation system so as to rapidly allocate component carriers used for communication when a UE accesses a LTE-A cell.

In order to achieve the above object, a technical scheme of the present invention is implemented as described hereinafter.

The present invention provides a method for allocating a carrier in a carrier aggregation system comprising:

a network side allocating a component carrier and identifier information of a user equipment to the user equipment, and notifying the user equipment of the allocated component carrier and the identifier information of the user equipment, and/or a corresponding relationship between the allocated downlink component carrier and the identifier information of the user equipment.

Preferably, the network side notifying the user equipment specifically comprises the network side notifying the user equipment by broadcast or dedicated signaling.

Preferably, the dedicated signaling includes Radio Resource Control (RRC) signaling, or a Media Access Control (MAC) control unit or Physical Downlink Control Channel (PDCCH) signaling.

Preferably, the method further comprises:
the network side carrying the identifier information of the user equipment in a downlink component carrier where a downlink control channel is located.

Preferably, the corresponding relationship between the allocated downlink component carrier and the identifier information of the user equipment specifically is a corresponding relationship between the downlink control channel of the allocated downlink component carrier and the identifier information of the user equipment.

Preferably, the identifier information of the user equipment contains a Radio Network Temporary Identifier (RNTI), which is at least one of a Cell Radio Network Temporary Identifier (C-RNTI), a Semi-static Persistent Scheduling Radio Network Temporary Identifier (SPS-RNTI), and a Transmit Power Control RNTI (TPC-RNTI).

Preferably, in the method:
TPC-RNTIs allocated on different carriers by the same user equipment are same or different.

Preferably, the method further comprises:
when a downlink shared channel indicated by the downlink control channel is not carried in the downlink component carrier carrying the downlink control channel, notifying the user equipment of downlink component carrier information carrying the downlink shared channel through the broadcast or dedicated signaling.

Preferably, the method further comprises:

the network side allocating uplink component carrier information to the user equipment, and notifying the user equipment through the broadcast or dedicated signaling, wherein the uplink component carrier information includes uplink component carrier information where the uplink control channel is located.

Preferably, the method further comprises:
the network side notifying the user equipment of a corresponding relationship between the uplink component carrier and the downlink component carrier through the broadcast or dedicated signaling.

A device for allocating a carrier in carrier aggregation system comprises an allocation unit, a first corresponding relationship establishment unit and a notification unit, wherein:

the allocation unit is configured to allocate a component carrier and identifier information of a user equipment to the user equipment;

the first corresponding relationship establishment unit is configured to establish a corresponding relationship between the identifier information of the user equipment and the downlink component carrier allocated to the user equipment; and the notification unit is configured to notify the user equipment of the allocated component carrier and the identifier information of the user equipment, and/or the corresponding relationship between the allocated downlink component carrier and the identifier information of the user equipment.

Preferably, the notification unit notifies the user equipment of the allocated component carrier and the identifier information of the user equipment, and/or the corresponding relationship between the allocated downlink component carrier and the identifier information of the user equipment by broadcast or dedicated signaling; wherein the dedicated signaling includes Radio Resource Control (RRC) signaling, or a Media Access Control (MAC) control unit or Physical Downlink Control Channel (PDCCH) signaling.

Preferably, the device further comprises:
a carrying unit configured to carry the identifier information of the user equipment in a downlink component carrier where a downlink control channel is located.

Preferably, the identifier information of the user equipment contains a Radio Network Temporary Identifier (RNTI), which is at least one of a Cell Radio Network Temporary Identifier (C-RNTI), a Semi-static Persistent Scheduling Radio Network Temporary Identifier (SPS-RNTI), and a Transmit Power Control RNTI (TPC-RNTI).

Preferably, the device further comprises a first determination unit and a second corresponding relationship establishment unit, wherein:

the first determination unit is configured to trigger the second corresponding relationship establishment unit when determining that a downlink shared channel indicated by the downlink control channel is not carried in the downlink component carrier carrying the downlink control channel; and the second corresponding relationship establishment unit is configured to establish a corresponding relationship between the downlink component carrier carrying the downlink control channel and the downlink component carrier carrying the downlink shared channel, and the notification unit notifies the user equipment of the corresponding relationship established by the second corresponding relationship establishment unit by the broadcast or dedicated signaling.

Preferably, the device further comprises:
a second determination unit configured to determine an uplink component carrier carrying an uplink control channel.

The notification unit further notifies the user equipment of the determined uplink component carrier carrying uplink component carrier information through the broadcast or dedicated signaling.

In the present invention, after receiving a service access request of the user equipment, the network side allocates component carriers used for communicating with the network side to the user equipment based on bandwidth required for services requested by the user equipment and service carrying situations of the current component carriers, or allocates component carriers to the user equipment based on specified application rules of the component carriers, and notifies the user equipment after completing the allocation of the component carriers. The technical scheme of the present invention is simple and practical to implement.

PREFERRED EMBODIMENTS OF THE PRESENT INVENTION

A basic concept of the present invention is that the network side allocates component carriers used for communicating with the network side to the user equipment based on bandwidth required for services requested by the user equipment and service carrying situations of the current component carriers after receiving a service access request of the user equipment, or allocates component carriers to the user equipment based on specified application rules of the component carriers, and notifies the user equipment after completing the allocation of the component carriers.

In order to understand the objects, technical scheme and advantages of the present invention more clearly and easily, the present invention will be further described in detail by way of example and with reference to the figures.

The main basis of the present invention for allocating component carriers to a UE accessing services in a LTE-A cell is bandwidth requirement of the services requested by the UE or specified application principles of the component carriers. It is well known that future communication services will be rather abundant, and multimedia services with a higher bandwidth requirement will be core services of the future wireless communication system. Because the supported service types are various and Quality of Service (QoS) requirements of various services are quite different, how to satisfy bandwidth requirement of the services requested by the UE is a main principle on which the allocation of the component carriers of the present invention is based. For different service requirements, the network side allocates corresponding component carrier resources to the UE which requests the services. The application principles of the component carriers are mainly used for some special UEs, such as a UE in the LTE system, to which the component carriers is allocated should be backward compatible carriers, or the UE used in principle in the LTE system is only able to use carrier resources in the original LTE system. Or for a certain type of UE, since a radio frequency module itself only supports a specified frequency band, the network side should set application principles of the component carriers for the UE, namely only its supported component carriers can be allocated to the UE.

The essence of the technical scheme of the present invention will be further described in conjunction with particular embodiments.

Figure 1:
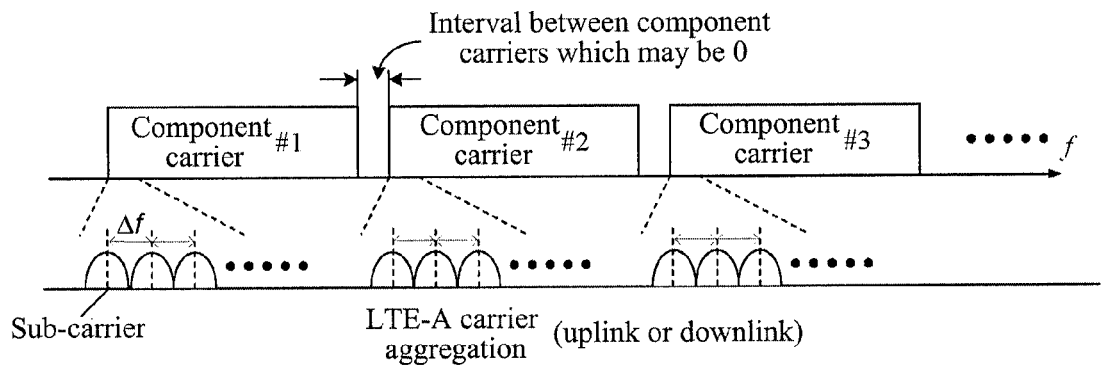
FIG. 1 is a schematic diagram of a relationship between carrier aggregation and component carriers in a LTE-A system.
Figure 2:
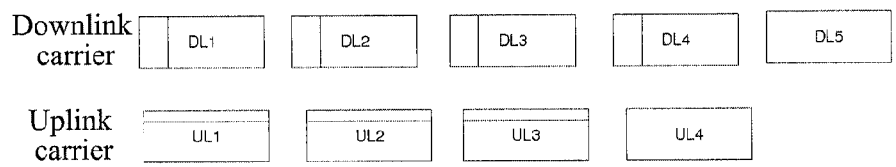
FIG. 2 is a schematic diagram of a PDCCH carrying way in component carriers in the LTE-A system.

A LTE-A cell (CELL_LTE_A) is composed of 4 uplink carriers and 5 downlink component carriers. FIG. 2 is a schematic diagram of a PDCCH carrying way in the component carriers in the LTE-A system. As shown in FIG. 2, DL1 to DL5 denote the downlink component carriers respectively, and UL1 to UL4 denote the uplink component carriers, wherein DL1 to DL4 are backward compatible downlink component carriers, and DL5 is a non backward compatible downlink component carrier. There is many ways to make a carrier to become a non backward compatible carrier, such as a carrier in a non LTE frequency band, or a carrier whose subframe format is not compatible with the LTE. UL1 to UL3 are backward compatible uplink component carriers, and UL4 is a non backward compatible uplink component carrier. The non backward compatible carrier is an optional deployment way, that is to say, all the carriers may be backward compatible. As shown in FIG. 2, in the backward compatible component carriers, resource scheduling is required to support a scheduling way of the LTE. There is a downlink control channel (PDCCH) on the downlink component carriers, and the downlink control channel can allocate the downlink or uplink shared channel for use by the UE. The downlink control channel in the cell of the LTE system is only able to schedule physical downlink shared channel resources on the downlink carriers where the downlink control channel is located and uplink carrier resources corresponding to the downlink carriers. In the LTE-A system, on the basis of the compatibility with this scheduling way, the downlink control channel may also schedule the shared channel of other carriers.

Schemes of allocating carriers where the downlink control channel, downlink shared channel, uplink control channel and uplink shared channel are located respectively will be described below.

A plurality of Control Channel Elements (CCE) is transmitted on the downlink control channel (PDCCH). A UE determines whether it needs to receive control information based on RNTI information contained in a CCE. A RNTI of system broadcast information or paging information is appointed by the protocol in advance, for example, S-RNTI=0xFFFF, and P-RNTI=0xFFFE are specified. When the UE is required to receive broadcast or paging on a downlink carrier, the UE is only required to detect whether the S-RNTI or P-RNTI is carried on a CCE of a certain carrier. If the CCE is found, then scheduling information where the corresponding broadcast or paging is located can be determined. The broadcast and paging data can be received through the scheduling information.

In the present invention, for the dedicated service data of the specified UE, a network side allocates, through the dedicated signaling, a RNTI specially use by the UE, such as C-RNTI, SPS-RNTI, etc., to the UE, so as to indicate scheduling resources for the UE. In CELL_LTE_A, the UE initiates a service access request to a network after accessing a cell, the network side determines the bandwidth information required for services requested by the UE based on the service type of the UE, for example the network side determines that the UE needs resources of two component carriers, and the network allocates C-RNTI1=0xFF00 on DL1 and C-RNTI2=0xFF00 on DL2 to the UE through Radio Resource Control (RRC) signaling, such as RRC Connection Reconfiguration message. Namely, the network side allocates the two downlink component carriers respectively, DL1 and DL2, to the UE, allocates C-RNTI1 and C-RNTI2 on DL1 and DL2 to the UE, notifies the UE of the dedicated signaling, such as the above mentioned RRC Connection Reconfiguration message, and notifies the UE of the corresponding relationship between the downlink component carrier allocated to the UE and its C-RNTI, or optionally the PDCCH and its corresponding C-RNTI resources, such as a list of component carriers where the PDCCH is located, which are contained in IE "PDCCH-ConfigDedicated". The list includes center frequency point and bandwidth information of the component carrier and C-RNTI information used by the UE on the PDCCH, or "PDCCH-ConfigDedicated" information configured according to the list of the component carriers. Thus, the UE monitors DL1 and DL2, and detects the CCE in the PDCCH on DL1 and DL2 whenever receiving the PDCCH. If the C-RNTI1 and C-RNTI2 are contained in the CCEs in the PDCCHs on DL1 and DL2 respectively, the UE determines that control information of the PDCCH carried in the current downlink component carrier is sent to the UE itself; otherwise, data in a subframe where the PDCCH is located is discarded. The network side can also allocate one C-RNTI=0xFF00 to both DL1 and DL2, and notifies the UE of the corresponding relationship, namely, the valid range of the C-RNTI is within DL1 and DL2. A set of such component carriers in which the RNTI is valid may be one or more of downlink component carriers, or even may be all the downlink component carriers. All the component carriers associated with the C-RNTI are component carriers carrying the PDCCH. The UE monitors DL1 and DL2, and detects only the CCEs in the PDCCHs on DL1 and DL2 respectively whenever receiving the PDCCH. If C-RNTI(0xFF00) is contained in the CCEs in the PDCCHs on DL1 and DL2 respectively, the UE can determine that the control information of the PDCCH carried on the current downlink component carrier is sent to the UE itself; otherwise, data in the subframe where the PDCCH is located is discarded. The C-RNTI corresponding to the downlink component carrier allocated to the UE may also be a SPS-RNTI and other scheduling RNTI of resources specially used by the UE, or a scheduling RNTI specially used by other groups of UEs, such as the TPC-RNTI. A CCE indicated by this RNTI contains power control information of a group of UEs, and all the UEs in the group can receive information in the CCE. In the LTE-A system, the same UE can allocate different TPC-RNTIs on different carriers, that is to say, the TPC-RNTIs can belong to different groups of UEs on different component carriers. In the present invention, after the downlink component carrier resources are determined for the UE based on the services requested by the UE, the RNTI specially used by the UE is further allocated to each component carrier of the UE, and the corresponding relationship between the RNTI and the allocated downlink component carrier is notified to the UE, so as to implement the allocation of the downlink component carrier of the UE very well.

In the LTE system, the C-RNTI can be allocated through a MAC Control Element (CE). The UE first sends uplink random access pilot through a random access process, and the network side sends a Random Access Response (RAR) containing temporary C-RNTI information through the MAC CE after receiving the uplink random access pilot. The temporary C-RNTI can be used as a formal C-RNTI after the random access succeeds. In the LTE-Carrier aggregation system, C-RNTIs of different component carriers can be obtained from RAR information received by the corresponding downlink component carriers, for example the UE is notified of available component carriers through the dedicated signaling. The UE receives the MAC CCE, such as the RAR, on the corresponding component carriers respectively through a MAC flow, such as the random access process, wherein the contained C-RNTI may be considered as the C-RNTI used on the PDCCH of the downlink component carrier. The carrier to which the allocated C-RNTI belongs may also be indicated by containing a carrier identity in the MAC CE on a certain carrier, and the C-RNTI for allocating is used by carriers indicated by the "Carrier Identity", including the present carrier. In the present invention, the C-RNTI information corresponding to the carrier can be provided to the UE or the group of UEs in a format of the CCE in the extended PDCCH.

Therefore, the UE can only monitor the PDCCH of the downlink component carrier with the specified RNTI, and this RNTI may be appointed by the protocol or allocated by the network.

Figure 3:
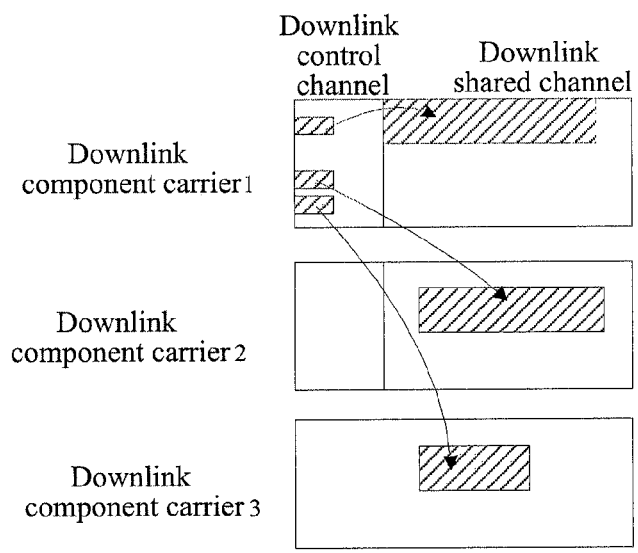
FIG. 3 is a schematic diagram of a corresponding relationship between the PDCCH and PDSCH in downlink component carriers in the LTE-A system.

In the LTE system, the PDCCH and PDSCH are adjacent in time domain. When the UE monitors the PDCCH and receives the control information sent to the UE itself by the downlink component carrier through the PDCCH, if the control information schedules downlink shared channel resources, then the scheduled resources will be sent in a resource block immediately after the PDCCH. In the LTE-A system, since the PDCCH can schedule resources of other component carriers, FIG. 3 is a schematic diagram of a corresponding relationship between the PDCCH and PDSCH in the downlink component carrier in the LTE-A system. As shown in FIG. 3, the PDCCH of downlink component carrier 1 can schedule resources on downlink component carrier 3, although carrier resources of downlink component carriers 1 and 3 are separated in frequency domain, resources on the PDSCH of downlink component carrier 3 scheduled by the PDCCH of downlink component carrier 1 is closely adjacent to the PDCCH of downlink component carrier 1 in time domain. If the UE monitors and receives the PDCCH on downlink component carrier 1 only, but does not monitors downlink component carrier 3, and when the PDSCH is determined to be carried on downlink component carrier 3, the UE possibly does not have time to switch a radio frequency processing module to receive the resources on downlink component carrier 3. Therefore, when the downlink component carrier is allocated to the UE, both the downlink component carrier carrying the PDCCH and the downlink component carrier carrying the PDSCH are required to be notified to the UE. The UE monitors all of the notified downlink component carriers, determines, by the network side, the PDCCH sent to the UE itself based on the allocated or specified RNTI specially used by the UE, and monitors the PDSCH to obtain downlink service data.

Therefore, in addition to knowing the downlink carrier that can receive the PDCCH, the UE is required to know the carrier where the PDCCH is located that may be scheduled by the PDCCH. When the PDCCH does not schedules downlink component carrier resources except the downlink component carrier where the PDCCH is located, the downlink component carrier carrying the PDSCH and the downlink component carrier carrying the PDCCH are the same downlink component carrier, and the UE can monitor only one downlink component carrier. The network side can indicate though RRC signaling such as RRC Connection Reconfiguration information that the carrier where the PDSCH is located that is required to be received by the UE is consistent with the carrier where the PDCCH is located, or the same downlink component carrier is believed by default to carry both the PDCCH and PDSCH when indication information is not included. Specifying the PDCCH to receive carriers by the above method may be to allocate C-RNTI1=0xFF05 on DL1 and allocate C-RNTI2=0xFF08 on DL2, thus the UE receives the PDCCH on DL1 and DL2 respectively. In a configuration where carriers carry the PDCCH and PSSCH are same, the PDSCH is also on DL1 and DL2, namely the PDSCH scheduled by the PDCCH will only be carried on DL1 and DL2. When the PDCCH schedules PDSCH resources of other downlink component carriers, the network notifies, through the dedicated signaling, the UE of a set of downlink carriers of the PDSCHs required to be received by the UE so as to reduce the number of PDSCH carriers required to be received by the UE. Of course, if the capacity of the UE is enough, the downlink carrier of the PDSCH required to be received by the UE may be not constrained, namely the UE can receive all of the PDSCH carriers. The information that the PDSCH carriers are received may also be contained by a new extended MAC CE.

The uplink control channel (PUCCH) is allocated in two ways in the LTE, one being to configure fixed PUCCH resources through RRC signaling, the other being to connect to one corresponding PUCCH resource by the position where a CCE of the PDCCH is located according to the rule predefined by the protocol. Since there is only one uplink carrier and one downlink carrier in the LTE system, and all corresponding relationships are clear, there are a plurality of uplink carriers and downlink carriers in the LTE-A system, and even the number of the uplink component carriers is different from the number of the downlink component carrier, thus a new method is required to define the allocation problem of the PUCCH in the LTE-A system.

The present invention will first define the corresponding relationship between the uplink component carrier and the downlink component carrier in the LTE-A cell in carrier aggregation scenario, and notify the UE of the corresponding relationship by broadcast or dedicated signaling. The corresponding relationship between uplink component carriers and downlink component carriers may be fixed, namely all the UEs use the same corresponding relationship, which may be notified to the UE by system broadcast. The corresponding relationship between carriers may be for the UE, for example, DL1 corresponds to UL1 for UE1, DL2 corresponds to UL1 for UE2. Such corresponding relationship may be notified to each UE by the dedicated signaling. After the corresponding relationship between uplink component carriers and downlink component carriers is defined, fixed PUCCH resources may be allocated by the dedicated signaling such as RRC signaling, or a carrying position of the corresponding PUCCH in the component carrier may be determined by a resource position of the downlink component carrier according to rules predefined by the protocol. Since determining the corresponding relationship between the carrying position of the PUCCH and the resource position of the downlink component carrier is easy to implement, and it is not emphasis of the technical scheme of the present invention, it will not be described in detail herein any more.

The uplink component carrier carrying the PUSCH may be specified in a way similar to that described for PDSCH. The corresponding relationship between the uplink component carriers and downlink component carriers is first defined by the dedicated signaling or broadcast, and is based on the uplink component carrier corresponding to the downlink component carrier where the PDCCH is located, namely the uplink component carrier where the PUSCH is located. The UE may carry the PUSCH in the corresponding resource position by the uplink component carrier allocated by the network side, and indicate the carrying position of the PUSCH through the PUCCH. Generally, both the PUCCH and PUSCH are carried on the same uplink component carrier.

In the present invention, the network side can number all the component carriers, and then find the corresponding carrier according to the numbers during subsequent scheduling of carrier allocation resources. The numbering may be done according to cell, for example, when the PDCCH schedules resources on the scheduled DL2, DL3 or DL4, the corresponding downlink carrier numbers are 2, 3 and 4. This way of numbering may be broadcasted by the system or configured in the system; or the numbering is done according to the component carriers used by the UE. For scheduling of a certain UE, numbers 1, 2 and 3 correspond to carriers DL2, DL3 and DL4. Such numbering may be notified to the UE by the dedicated signaling such as RRC signaling, MAC CE or PDCCH signaling. The numbering of uplink component carriers during the uplink scheduling is done in the same way as the above mentioned way.

In the present invention, the component carrier allocated by the UE can also be set in advance, for example, for a special UE, the available uplink and downlink component carriers are determinate. At this point, when the special UE makes a service access request, the network side allocates corresponding uplink and downlink component carriers to the special UE according to the specified application rules of component carriers, and notifies the UE. When uplink and downlink component carriers that can be used by the UE are unique, only the RNTI specially used by the UE is notified to the UE.

Figure 4:
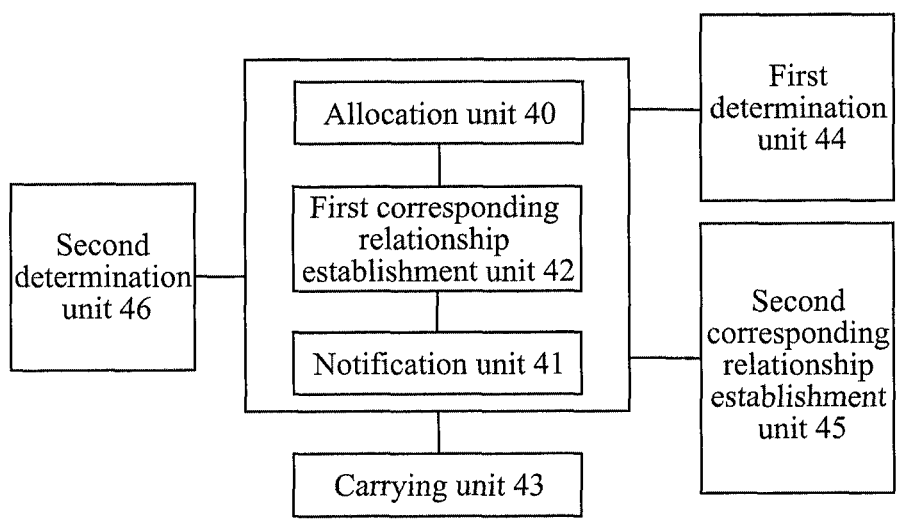
FIG. 4 is a block diagram of a device for allocating a carrier in carrier aggregation system according to the present invention.

FIG. 4 is a block diagram of a device for allocating a carrier in a carrier aggregation system according to the present invention. As shown in FIG. 4, the device for allocating a carrier in the carrier aggregation system according to the present invention comprises an allocation unit 40, a first corresponding relationship establishment unit 42 and a notification unit 41. The allocation unit 40 is configured to allocate component carriers and identifier information of a user equipment to the user equipment. The first corresponding relationship establishment unit 41 is configured to establish the corresponding relationship between the identifier information of the user equipment and a downlink component carrier allocated to the user equipment. The notification unit 42 is configured to notify the allocated component carrier and the identifier information of the user equipment, and/or the corresponding relationship between the allocated component carrier and the identifier information of the user equipment to the user equipment. The notification unit 42 further notifies the user equipment of the allocated component carrier and the identifier information of the user equipment, and/or the corresponding relationship between the allocated component carrier and the identifier information of the user equipment by broadcast or dedicated signaling. The dedicated signaling includes Radio Resource Control (RRC) signaling, a Media Access Control (MAC) control unit or physical downlink control channel (PDCCH) signaling.

As shown in FIG. 4, the device for allocating the carrier in the carrier aggregation system according to the present invention further comprises a carrying unit 43 configured to carry the identifier information of the user equipment in a downlink component carrier where a downlink control channel is located. The identifier information of the user equipment includes a RNTI, which is at least one of a Cell Radio Network Temporary Identifier (C-RNTI), a Semi-static Persistent Scheduling Radio Network Temporary Identifier (SPS-RNTI) and a Transmit Power Control RNTI (TPC-RNTI).

As shown in FIG. 4, the device for allocating the carrier in the carrier aggregation system according to the present invention further comprises a first determination unit 44 and a second corresponding relationship establishment unit 45. The first determination unit 44 is configured to determine whether a downlink shared channel indicated by the downlink control channel is carried in the downlink component carrier carrying the downlink control channel, and if not, trigger the second corresponding relationship establishment unit 45, and if yes, determine by default that the downlink control channel and downlink shared channel are carried on the same downlink component carrier without processing, or still notify the user equipment through the notification unit 41 that the downlink control channel and downlink shared channel are carried on the same downlink component carrier. The second corresponding relationship establishment unit 45 is configured to establish the corresponding relationship between the downlink component carrier carrying the downlink control channel and the downlink component carrier carrying the downlink shared channel. The notification unit 41 notifies, by broadcast or dedicated signaling, the user equipment of the corresponding relationship established by the second corresponding relationship establishment unit 45.

As shown in FIG. 4, the device for allocating the carrier in the carrier aggregation system according to the present invention further comprises a second determination unit 46 configured to determine the uplink component carrier carrying the uplink control channel. The notification unit 41 further notifies the user equipment of the determined uplink component carrier carrying uplink component carrier information by broadcast or dedicated signaling.

It should be understood by those skilled in the art that the carrying unit 43, the first determination unit 44, the second corresponding relationship establishment unit 45 and the second determination unit 46 in the device for allocating the carrier in the carrier aggregation system shown in FIG. 4 are all configured to optimize the device for allocating the carrier in the carrier aggregation system according to the present invention, and are not intended to implement necessary technical features of the device shown in FIG. 4. The technical features may be combined with the allocation unit 40 and the notification unit 41 respectively to form preferred different technical schemes, as described above.

The above description is only the preferred embodiments of the present invention, and is not intended to limit the protection scope of the present invention.

What is claimed is:

1. A method for allocating a carrier in a carrier aggregation system comprising:
a network side allocating component carriers and identifier information of a user equipment to the user equipment, and notifying the user equipment of the allocated component carrier and the identifier information of the user equipment, and a corresponding relationship between the allocated downlink component carrier and the identifier information of the user equipment;
wherein the network side allocates the component carriers used for communicating with the network side to the user equipment based on bandwidth required for services requested by the user equipment and service carrying situations of the current component carrier after receiving a service access request from the user equipment, and for a user equipment in a LTE system, component carriers allocated to the user equipment are backward compatible carriers or carrier resources in an original LTE system.

2. The method according to claim 1, wherein the network side notifying the user equipment comprises the network side notifying the user equipment by broadcast or dedicated signaling.

3. The method according to claim 2, wherein the dedicated signaling includes Radio Resource Control (RRC) signaling, or a Media Access Control (MAC) control unit or Physical Downlink Control Channel (PDCCH) signaling.

4. The method according to claim 1, further comprising:
the network side carrying the identifier information of the user equipment in a downlink component carrier where a downlink control channel is located.

5. The method according to claim 4, wherein the corresponding relationship between the allocated downlink component carrier and the identifier information of the user equipment is a corresponding relationship between the downlink control channel of the allocated downlink component carrier and the identifier information of the user equipment.

6. The method according to claim 4, wherein the identifier information of the user equipment contains a Radio Network Temporary Identifier (RNTI), which is at least one of a Cell Radio Network Temporary Identifier (C-RNTI), a Semi-static Persistent Scheduling Radio Network Temporary Identifier (SPS-RNTI), and a Transmit Power Control RNTI (TPC-RNTI).

7. The method according to claim 6, wherein
TPC-RNTIs allocated on different carriers by the same user equipment are same or different.

8. The method according to claim 4, further comprising:
when a downlink shared channel indicated by the downlink control channel is not carried in the downlink component carrier carrying the downlink control channel, notifying the user equipment of downlink component carrier information carrying the downlink shared channel through the broadcast or dedicated signaling.

9. The method according to claim 4, further comprising:
the network side allocating uplink component carrier information to the user equipment, and notifying the user equipment through the broadcast or dedicated signaling, wherein the uplink component carrier information includes uplink component carrier information where the uplink control channel is located.

10. The method according to claim 9, further comprising:
the network side notifying the user equipment of a corresponding relationship between the uplink component carrier and the downlink component carrier through the broadcast or dedicated signaling.

11. A device for allocating a carrier in carrier aggregation system comprising an allocation unit, a first corresponding relationship establishment unit and a notification unit, wherein:
the allocation unit is configured to allocate component carriers and identifier information of a user equipment to the user equipment; wherein the component carriers used for communicating with the device to the user equipment are allocated based on bandwidth required for services requested by the user equipment and service carrying situations of the current component carrier after receiving a service access request of the user equipment, and for a user equipment in a LTE system, component carriers allocated to the user equipment are backward compatible carriers or carrier resources in an original LTE system;
the first corresponding relationship establishment unit is configured to establish a corresponding relationship between the identifier information of the user equipment and the downlink component carrier allocated to the user equipment; and the notification unit is configured to notify the user equipment of the allocated component carrier and the identifier information of the user equipment, and the corresponding relationship between the allocated downlink component carrier and the identifier information from the user equipment.

12. The device according to claim 11, wherein the notification unit notifies the user equipment of the allocated component carriers and the identifier information of the user equipment, and/or the corresponding relationship between the allocated downlink component carrier and the identifier information of the user equipment by broadcast or dedicated signaling; wherein the dedicated signaling includes Radio Resource Control (RRC) signaling, or a Media Access Control (MAC) control unit or Physical Downlink Control Channel (PDCCH) signaling.

13. The device according to claim 11, further comprising:
a carrying unit configured to carry the identifier information of the user equipment in a downlink component carrier where a downlink control channel is located.

14. The device according to claim 13, wherein the identifier information of the user equipment contains a Radio Network Temporary Identifier (RNTI), which is at least one of a Cell Radio Network Temporary Identifier (C-RNTI), a Semi-static Persistent Scheduling Radio Network Temporary Identifier (SPS-RNTI), and a Transmit Power Control RNTI (TPC-RNTI).

15. The device according to claim 13, further comprising a first determination unit and a second corresponding relationship establishment unit, wherein:

the first determination unit is configured to trigger the second corresponding relationship establishment unit when determining that a downlink shared channel indicated by the downlink control channel is not carried in the downlink component carrier carrying the downlink control channel; and the second corresponding relationship establishment unit is configured to establish a corresponding relationship between the downlink component carrier carrying the downlink control channel and the downlink component carrier carrying the downlink shared channel, and the notification unit notifies the user equipment of the corresponding relationship established by the second corresponding relationship establishment unit by the broadcast or dedicated signaling.

16. The device according to claim 13, wherein the device further comprises:
a second determination unit configured to determine an uplink component carrier carrying an uplink control channel;
the notification unit further notifies the user equipment of the determined uplink component carrier carrying uplink component carrier information through the broadcast or dedicated signaling.

17. The method according to claim 2, further comprising:
the network side carrying the identifier information of the user equipment in a downlink component carrier where a downlink control channel is located.

18. The method according to claim 3, further comprising:
the network side carrying the identifier information of the user equipment in a downlink component carrier where a downlink control channel is located.

* * * * *